US008635004B2

(12) United States Patent
Whitney et al.

(10) Patent No.: US 8,635,004 B2

(45) Date of Patent: Jan. 21, 2014

(54) AXLE TORQUE BASED DRIVER INTERPRETATION WITH POWER SECURITY OF TRANSMISSION RATIOS

(75) Inventors: Christopher E. Whitney, Highland, MI (US); Michael Livshiz, Ann Arbor, MI (US)

(73) Assignee: GM Global Technology Operations LLC

( * ) Notice: Subject to any disclaimer, the term of this patent is extended or adjusted under 35 U.S.C. 154(b) by 1070 days.

(21) Appl. No.: 12/639,455

(22) Filed: Dec. 16, 2009

(65) Prior Publication Data

US 2011/0144887 A1 Jun. 16, 2011

(51) Int. Cl.

*G06F 19/00* (2011.01)
*G06F 17/00* (2006.01)
*G06G 7/70* (2006.01)

(52) U.S. Cl.

USPC ........... 701/103; 701/101; 701/102; 701/104; 701/110

(58) Field of Classification Search

CPC . F02D 41/28; F02D 2041/001; F02D 41/002; F02D 2200/0406; F02D 41/2467; F02D 41/0025; F02D 41/40; B60W 10/06

USPC ......................... 701/101, 102, 103, 104, 110; 123/406.23

See application file for complete search history.

(56) References Cited

U.S. PATENT DOCUMENTS

| | | | | |
|---|---|---|---|---|
| 5,184,527 | A * | 2/1993 | Nakamura | 477/110 |
| 5,496,227 | A * | 3/1996 | Minowa et al. | 477/62 |
| 2005/0148428 | A1* | 7/2005 | Cullen et al. | 477/110 |
| 2008/0220934 | A1* | 9/2008 | Babcock et al. | 477/5 |

OTHER PUBLICATIONS

U.S. Appl. No. 11/934,234, filed Nov. 2, 2007, Robert C. Simon Jr.

U.S. Appl. No. 12/432,240, filed Apr. 29, 2009, Christopher E. Whitney.

* cited by examiner

*Primary Examiner* — Stephen K Cronin
*Assistant Examiner* — Raza Najmuddin

(57) ABSTRACT

A control system includes an axle torque arbitration module, a power security module, a propulsion torque arbitration module, and an actuation module. The axle torque arbitration module determines an axle torque request based on a driver input and a vehicle speed. The power security module determines a secured torque request based on the axle torque request, the vehicle speed, and an engine speed. The propulsion torque arbitration module determines a propulsion torque request based on the axle torque request and the secured torque request. The actuation module controls at least one of air, spark, and fuel provided to a cylinder of an engine based on the propulsion torque request.

20 Claims, 6 Drawing Sheets

AXLE TORQUE BASED DRIVER INTERPRETATION WITH POWER SECURITY OF TRANSMISSION RATIOS

FIELD

The present disclosure relates to driver interpretation systems for internal combustion engines, and more particularly an axle torque driver interpretation system and method for a coordinated torque control (CTC) system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into spark-ignition engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

Driver interpretation systems have been developed to translate a driver input, such as an accelerator pedal position, into a desired propulsion system torque. The desired propulsion system torque may include a desired engine torque and/or a desired electric motor torque. Traditional driver interpretation systems, however, do not translate the driver input in a manner that satisfies driver expectation standards. Further, traditional driver interpretation systems do not translate the driver input in a manner that is compatible with both conventional internal combustion engine vehicles and hybrid electric vehicles.

SUMMARY

A control system includes an axle torque arbitration module, a power security module, a propulsion torque arbitration module, and an actuation module. The axle torque arbitration module determines an axle torque request based on a driver input and a vehicle speed. The power security module determines a secured torque request based on the axle torque request, the vehicle speed, and an engine speed. The propulsion torque arbitration module determines a propulsion torque request based on the axle torque request and the secured torque request. The actuation module controls at least one of air, spark, and fuel provided to a cylinder of an engine based on the propulsion torque request.

A method includes determining an axle torque request based on a driver input and a vehicle speed, determining a secured torque request based on the axle torque request, the vehicle speed, and an engine speed and determining a propulsion torque request based on the axle torque request and the secured torque request. The method further includes controlling at least one of air, spark, and fuel provided to a cylinder of an engine based on the propulsion torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
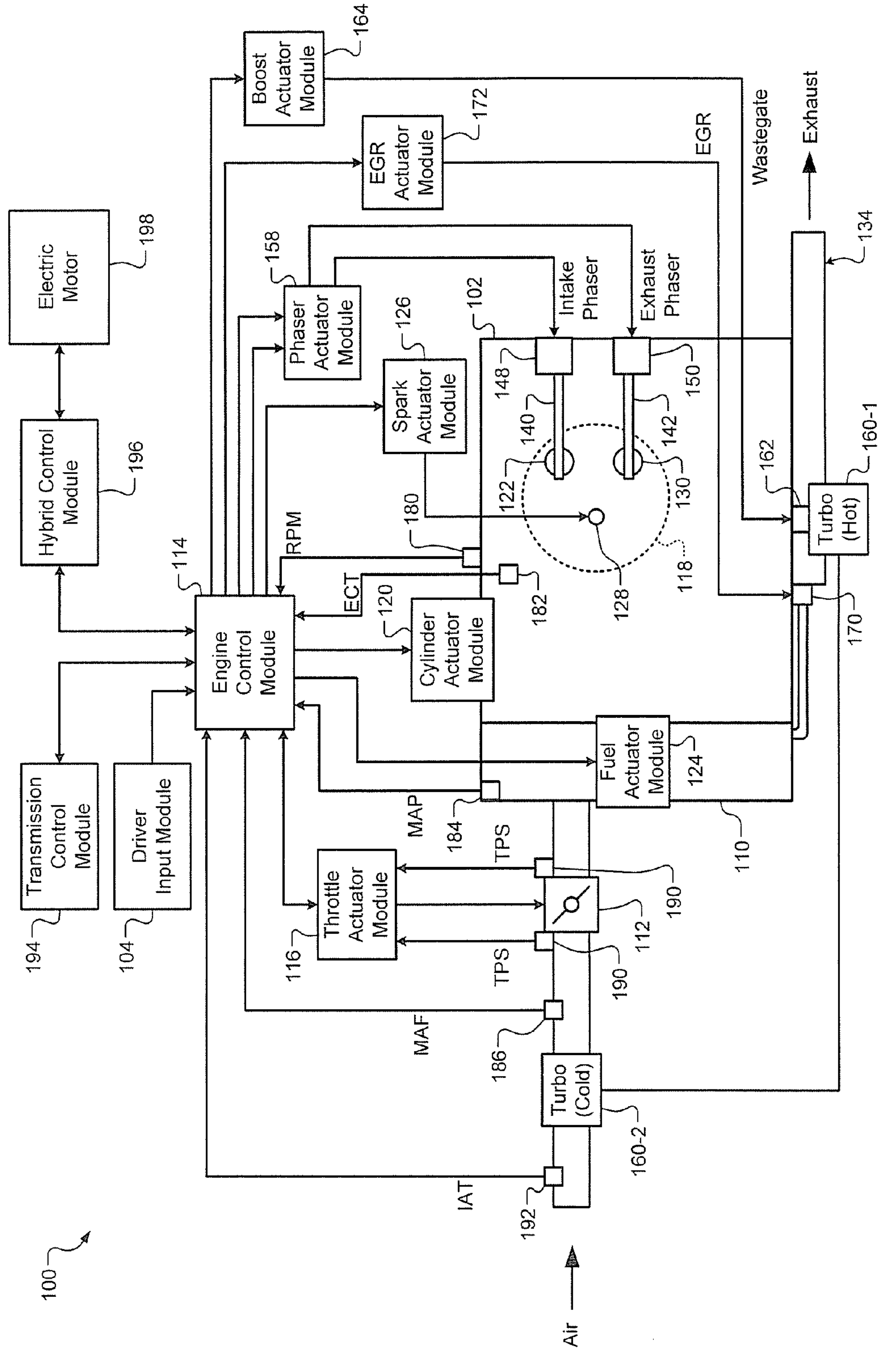
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Axle torque driver interpretation systems typically determine a desired axle torque based on a predetermined relationship between a driver input, a vehicle speed, and the desired axle torque. A desired propulsion torque is determined based on the axle torque and a transmission ratio. However, traditional axle torque driver interpretation systems require measured transmission input and output speeds to accurately determine the transmission ratio, which is necessary to accurately determine the desired propulsion torque. Redundant transmission speed sensors that increase vehicle costs are required to ensure that the measured transmission input and output speeds are accurate.

Propulsion torque driver interpretation systems typically determine a desired propulsion torque based on a predetermined relationship between a driver input, an engine speed, and the desired propulsion torque. A desired axle torque may then be determined based on the desired propulsion torque and a transmission ratio. However, propulsion torque driver interpretation systems do not do not interpret the driver input as accurately as axle torque driver interpretation systems because the driver input is more directly related to the desired axle torque than to the desired propulsion torque.

Propulsion power driver interpretation systems typically determine a desired propulsion power based on a driver input and a vehicle speed. A desired propulsion torque is then determined based on the desired propulsion power and an engine speed. However, traditional propulsion power driver interpretation systems do not interpret the driver input accurately during a vehicle launch, during a transmission shift, and/or during a controlled tire slip. This is because the engine speed may not be used to accurately translate the desired propulsion power into the desired propulsion torque during these events.

An axle torque driver interpretation system and method of the present disclosure determines a desired axle torque based on a predetermined relationship between a driver input, a vehicle speed, and the desired axle torque. An initial desired propulsion torque is determined based on the desired axle torque and a transmission ratio. A secured propulsion torque is determined based on the axle torque, the vehicle speed, and an engine speed. A final desired propulsion torque is determined based on an absolute minimum of the initial desired propulsion torque and a sum of the secured propulsion torque and a security threshold torque.

Since the driver input is directly related to the desired axle torque, the driver input is interpreted in a manner that satisfies acceleration rate standards. In addition, redundant transmission speed sensors are not required because the initial desired torque is compared to the secured propulsion torque to determine the final desired torque, which minimizes any inaccuracies introduced by the transmission ratio in the event of a transmission speed sensor failure. Moreover, the final desired torque is typically based on the initial desired torque such that the propulsion torque is not based on the engine speed, thereby avoiding inaccurate interpretations during a vehicle launch, during a transmission shift, and/or during a controlled tire slip.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. In addition, the spark actuator module 126 may have the ability to vary the timing of the spark for a given firing event even when a change in the timing signal is received after the firing event immediately before the given firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
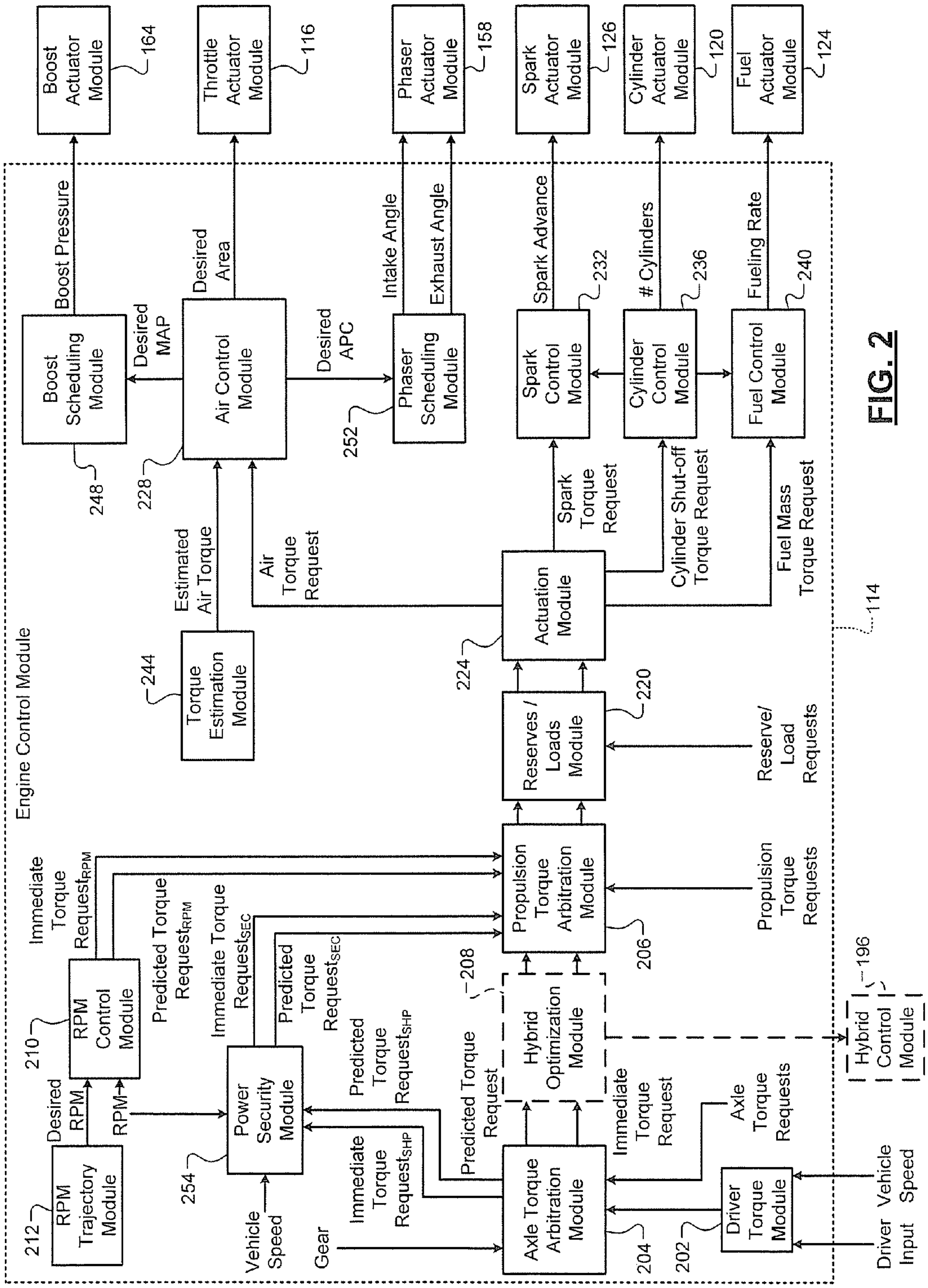
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings. The driver torque module 202 may select one of the mappings to determine the driver torque request based on a vehicle speed.

An axle torque arbitration module 204 arbitrates between the driver torque request from the driver torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips in the other direction with respect to the road surface because the axle torque is negative.

Axle torque requests may also include brake management requests and vehicle over-speed torque requests. Brake management requests may reduce engine torque to ensure that the engine output torque does not exceed the ability of the brakes to hold the vehicle when the vehicle is stopped. Vehicle over-speed torque requests may reduce the engine output torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 104 may selectively be adjusted by other modules of the ECM 114 before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to produce an engine output torque equal to the immediate torque request. However, different combinations of actuator values may result in the same engine output torque. The ECM 114 may therefore adjust the actuator values to allow a faster transition to the predicted torque request, while still maintaining the engine output torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine 102 to the immediate torque request. However, the ECM 114 controls the engine 102 so that the engine 102 can quickly resume producing the predicted torque request once the wheel slip stops.

In general terms, the difference between the immediate torque request and the higher predicted torque request can be referred to as a torque reserve. The torque reserve represents the amount of additional torque that the engine 102 can begin to produce with minimal delay. Fast engine actuators are used to increase or decrease actual engine output torque. As described in more detail below, fast engine actuators are defined in contrast with slow engine actuators.

In various implementations, fast engine actuators are capable of varying engine output torque within a range, where the range is established by the slow engine actuators. In such implementations, the upper limit of the range is the predicted torque request, while the lower limit of the range is limited by the torque capacity of the fast actuators. For example only, fast actuators may only be able to reduce engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests the predicted torque request to be output, the fast engine actuators can be controlled to vary the engine output torque to the top of the range, which is the predicted torque request.

In general terms, fast engine actuators can more quickly change the engine output torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the engine output torque to begin to change once the slow actuator begins to implement the changed actuator value. Generally, this amount of time will be longer for slow actuators than for fast actuators. In addition, even after beginning to change, the engine output torque may take longer to fully respond to a change in a slow actuator.

For example only, the ECM 114 may set actuator values for slow actuators to values that would enable the engine 102 to produce the predicted torque request if the fast actuators were set to appropriate values. Meanwhile, the ECM 114 may set actuator values for fast actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values for one or more fast actuators to values that correspond to the predicted torque request. Because the slow actuator values have already been set based on the predicted torque request, the engine 102 is able to produce the predicted torque request after only the delay imposed by the fast actuators. In other words, the longer delay that would otherwise result from changing engine output torque using slow actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required engine output torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator, while throttle opening area may be a slow actuator. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque) based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque request from the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to the actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

An actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuator module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel mass torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current amount of air per cylinder. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease engine output torque. The fuel control module 240 may then determine a fuel mass for each cylinder that achieves the desired air/fuel ratio. In diesel systems, fuel mass may be the primary actuator for controlling engine output torque.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel mass torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T=f(APC,S,I,E,AF,OT,\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#) \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

The driver torque module 202, the axle torque arbitration module 204, the propulsion torque arbitration module 206, and a power security module 254 may implement axle torque driver interpretation techniques of the present disclosure. The driver torque module 202 may determine the driver torque request based on the driver input and an actual vehicle speed, and may output the driver torque request to the axle torque arbitration module 204.

As discussed above, the axle torque arbitration module 204 arbitrates between the driver torque request from the driver torque module 202 and other axle torque requests. The axle torque arbitration module 204 outputs the predicted and immediate torque requests based on the results. The axle torque arbitration module 204 may determine a shaped predicted torque request and a shaped immediate torque request based on the predicted and immediate torque requests and a desired torque adjustment rate.

A driver may observe a clunk noise as an axle torque transitions through a zero torque. The axle torque arbitration module 204 may prevent the clunk noise by shaping the predicted and immediate torque requests to achieve the desired torque adjustment rate within upper and lower clunk zone torques. The axle torque arbitration module 204 may output the shaped predicted and immediate torque requests to the power security module 254. The axle torque arbitration module 204 may convert the shaped predicted and immediate torque requests from the axle torque domain to the propulsion torque domain using a gear of the transmission and output the converted torque requests to the propulsion torque arbitration module 206.

The power security module 254 may determine a secured predicted torque request and a secured immediate torque request based on the shaped predicted and immediate torque requests, the actual vehicle speed, and the actual RPM. The power security module 254 may determine the secured predicted and immediate torque requests based on an amount of power required to satisfy the shaped predicted and immediate torque requests at the actual vehicle speed. The power security module 254 may output the secured predicted and immediate torque requests to the propulsion torque arbitration module 206.

The propulsion torque arbitration module 206 may determine a clamped predicted torque request and a clamped immediate torque request based on the predicted and immediate torque requests received from the axle torque arbitration module 204 and the secured predicted and immediate torque requests. The propulsion torque arbitration module 206 may determine the clamped predicted and immediate torque requests based on the values that are closest to zero between the torque requests received from the axle torque arbitration module 204 and sums of the secured torque requests and a security threshold torque. The propulsion torque arbitration module 206 may output the clamped predicted and immediate torque requests to the reserves/loads module 220.

The driver torque module 202 enables satisfaction of acceleration rate standards by determining the driver torque request based on the driver input and the actual vehicle speed. The power security module 254 reduces reliance on transmission speed information by determining the secured torque requests based on power rather than torque that is determined using the transmission ratio. The propulsion torque arbitration module 206 reduces reliance on transmission speeds by using the secured torque requests to secure the torque requests received from the axle torque arbitration module 204. In addition, the propulsion torque arbitration module 206 typically outputs the torque requests received from the axle torque arbitration module 204 such that the outputted torques are not based on the engine speed, thereby avoiding inaccurate interpretations during a vehicle launch, during a transmission shift, and/or during a controlled tire slip.

Figure 3:
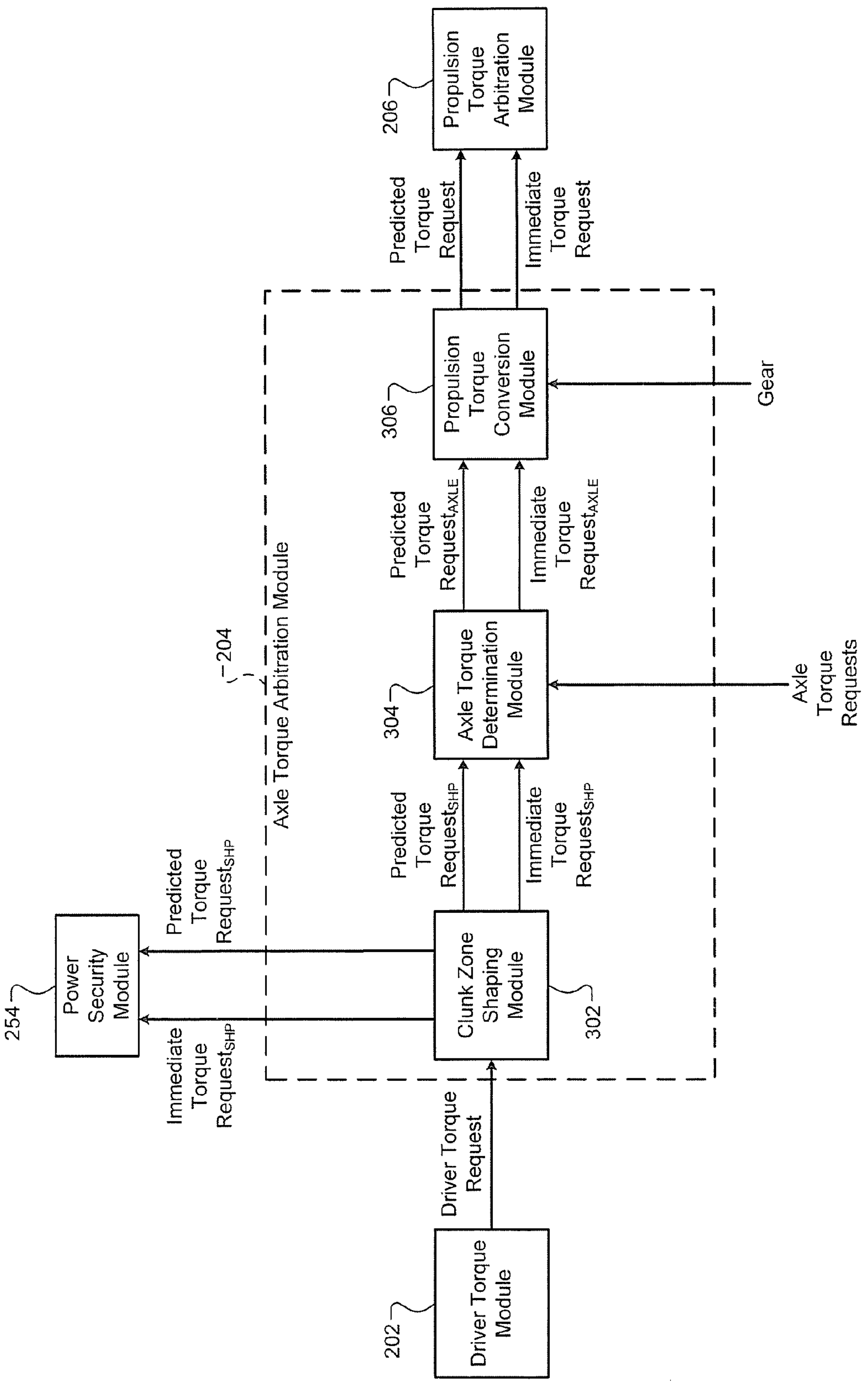
FIG. 3 is a functional block diagram of an exemplary axle torque arbitration module integrated in the engine control system of FIG. 1.

Referring now to FIG. 3, the axle torque arbitration module 204 may include a clunk zone shaping module 302, an axle torque determination module 304, and a propulsion torque conversion module 306. The clunk zone shaping module 302 may determine the shaped predicted and immediate torque requests based on the driver torque request and a desired torque adjustment rate.

The clunk zone shaping module 304 may select predicted and immediate torque requests that satisfy the driver torque request, then shape or adjust the selected predicted and immediate torque requests such that a resulting actual axle torque changes at the desired torque adjustment rate within a clunk zone defined by the upper and lower clunk zone torques. The desired torque adjustment rate may be predetermined to prevent the clunk noise that may occur as the actual axle torque transitions through a zero torque. The clunk zone shaping module 302 may output the shaped predicted and immediate torque requests to the axle torque determination module 304 and to the power security module 254.

The axle torque determination module 304 may determine a predicted axle torque request and an immediate axle torque request based on the shaped predicted and immediate torque requests and the other axle torque requests. The axle torque determination module 304 may arbitrate between the shaped predicted and immediate torque requests and the other axle torque requests. The axle torque determination module 304 may output the predicted and immediate axle torque requests to the propulsion torque conversion module 306 based on the results of arbitrating between the received torque requests.

The propulsion torque conversion module 306 may determine the predicted and immediate torque requests that are output by the axle torque arbitration module 204 based on the predicted and immediate axle torque requests and the gear of the transmission. The gear may be a commanded gear and/or an actual gear. For example, the propulsion torque conversion module 306 may determine the predicted torque request based on the predicted axle torque request and the commanded gear. In another example, the propulsion torque conversion module 306 may determine the immediate torque request based on the immediate axle torque request and the actual gear. The propulsion torque conversion module 306 may output the predicted and immediate torque requests to the propulsion torque arbitration module 206.

Figure 4:
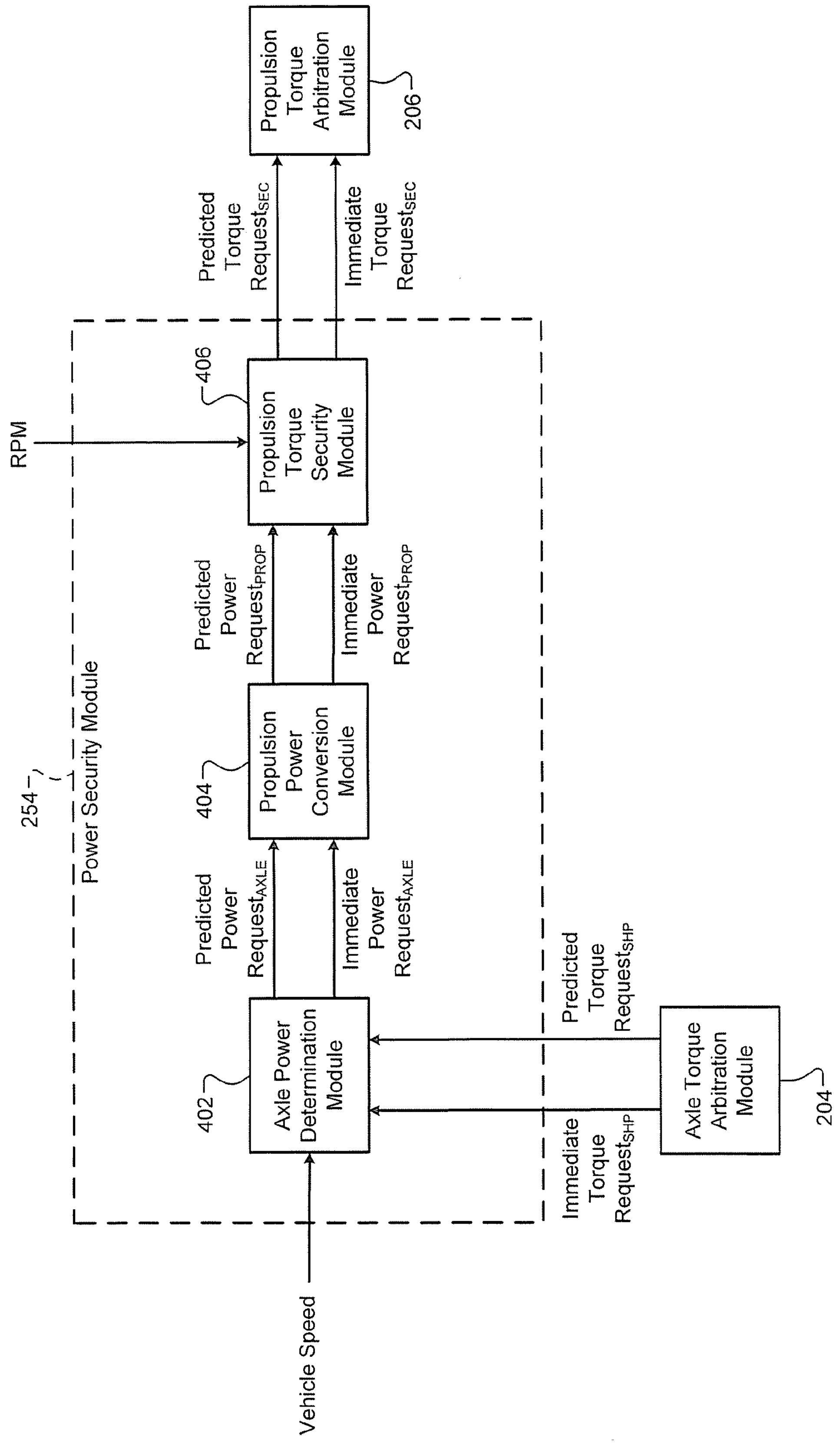
FIG. 4 is a functional block diagram of an exemplary power security module integrated in the engine control system of FIG. 1.

Referring now to FIG. 4, the power security module 254 may include an axle power determination module 402, a propulsion power conversion module 404, and a propulsion torque security module 406. The axle power determination module 402 may determine a predicted axle power request and an immediate axle power request based on the shaped predicted and immediate torque requests and the actual vehicle speed. The axle power determination module 402 may determine the predicted and immediate axle power requests based on an amount of power required to satisfy the shaped predicted and immediate torque requests at the actual vehicle speed. The axle power determination module 402 may output the predicted and immediate axle power requests to the propulsion power conversion module 404.

The propulsion power conversion module 404 may determine a predicted propulsion power request and an immediate propulsion power request based on the predicted and immediate axle power requests and mechanical losses in the transmission. The propulsion power conversion module 404 may determine the predicted and immediate propulsion power requests by compensating for the mechanical losses in the transmission to satisfy the predicted and immediate axle power requests. The propulsion power conversion module 404 may output the predicted and immediate propulsion power requests to the propulsion torque security module 406.

The mechanical losses in the transmission may be predetermined based on a minimum amount of mechanical losses measured for the transmission. The minimum amount of mechanical losses may be measured using load sensors at an input shaft of the transmission and an output shaft of the transmission during laboratory development and/or during vehicle operation. Determining the propulsion power requests based on the minimum amount of mechanical losses prevents the propulsion power requests from resulting in an actual axle torque that is greater than driver expectations. Thus, the predicted and immediate propulsion power requests determined based on the predetermined mechanical losses in the transmission are secure.

The propulsion torque security module 406 may determine a secured predicted torque request and a secured immediate torque request based on the predicted and immediate propulsion power requests and the actual RPM of the engine 102. The propulsion torque security module 406 may determine the secured predicted and immediate torque requests by converting the predicted and immediate propulsion power requests from a propulsion power domain (power at the crankshaft) into a propulsion torque domain (torque at the crankshaft) using the actual RPM. The propulsion torque security module 406 may output the secured predicted and immediate torque requests to the propulsion torque arbitration module 206.

Figure 5:
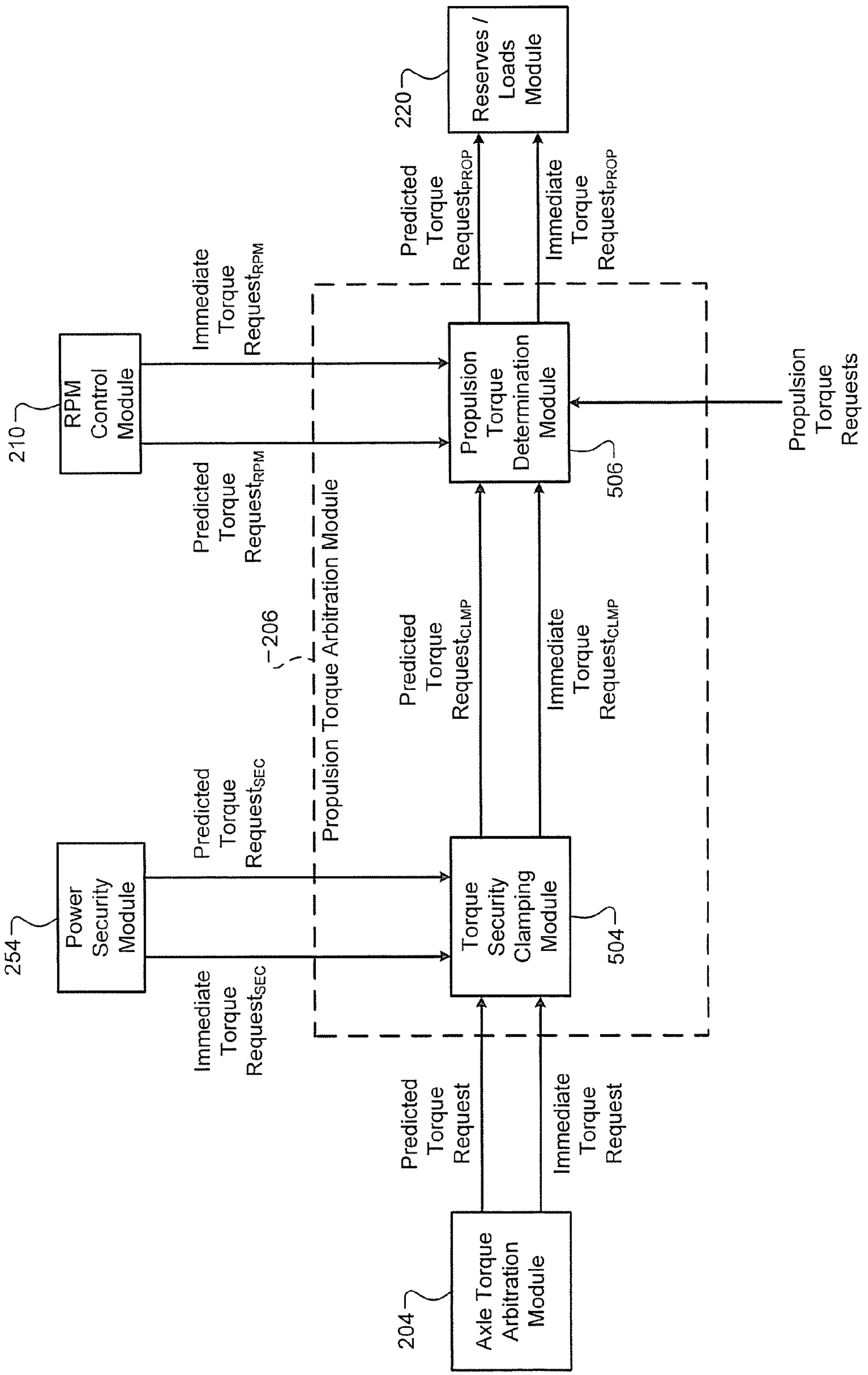
FIG. 5 is a functional block diagram of an exemplary propulsion torque arbitration module integrated in the engine control system of FIG. 1.

Referring now to FIG. 5, the propulsion torque arbitration module 206 may include a torque security clamping module 504 and a propulsion torque determination module 506. The torque security clamping module 504 may determine a clamped predicted torque request and a clamped immediate torque request based on the predicted and immediate torque requests received from the axle torque arbitration module 204 and the secured predicted and immediate torque requests received from the power security module 254. The torque security clamping module 504 may add the security threshold torque to each of the secured predicted and immediate torque requests. The security threshold torque may be determined such that the sums of the security threshold torque and each of the secured torque requests result in an absolute acceleration rate that is less than or equal to a maximum desired acceleration within a predetermined period. For example, the maximum desired acceleration and the predetermined period may be 0.2 g and 200 milliseconds, respectively. Determining the security threshold torque based on the absolute acceleration rate ensures that both positive and negative torque requests respectively result in accelerations and decelerations that are within the predetermined criteria.

The torque security clamping module 504 may determine the clamped predicted and immediate torque requests based on absolute minimums of the torque requests from the propulsion torque conversion module 306 and the sums of the secured torque requests and the security threshold torque. For example, the torque security clamping module 504 set the clamped predicted torque request to be equal to the predicted torque request from the propulsion torque conversion module 306 when an absolute value of the predicted torque request from the propulsion torque conversion module 306 is less than an absolute value of the sum of the secured predicted torque request and the security threshold torque.

In another example, the torque security clamping module 504 may set the clamped immediate torque request to be equal to the sum of the secured immediate torque request and the security threshold torque when an absolute value of the sum of the secured immediate torque request and the security threshold torque is less than an absolute value of the immediate torque request from the propulsion torque conversion module 306. The torque security clamping module 504 may output the clamped predicted and immediate torque requests to the propulsion torque determination module 506.

The propulsion torque determination module 506 may determine a predicted propulsion torque request and an immediate propulsion torque request based on the clamped predicted and immediate torque requests, the RPM predicted and immediate torque requests, and the other propulsion torque requests. The propulsion torque determination module 506 may arbitrate between the clamped predicted and immediate torque requests, the RPM predicted and immediate torque requests, and the other propulsion torque requests. The propulsion torque determination module 506 may output the predicted and immediate propulsion torque request to the reserves/loads module 220 based on the results of arbitrating between the received torque requests.

Figure 6:
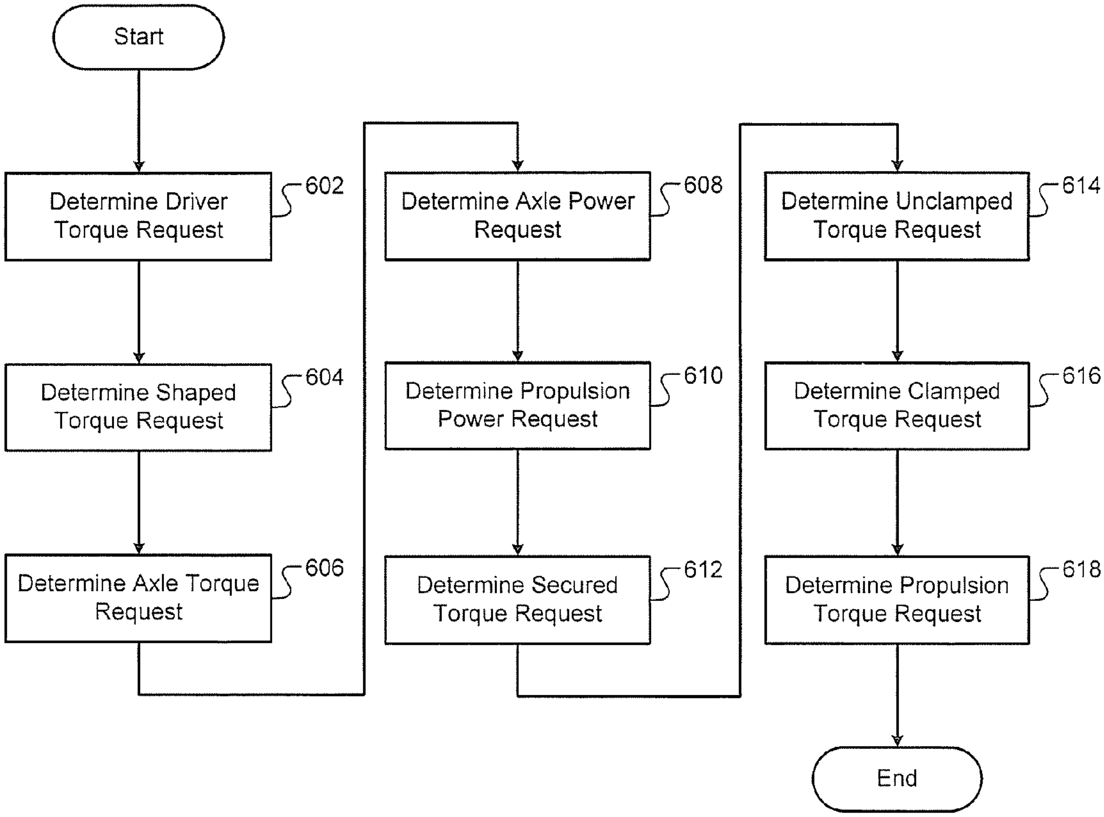
FIG. 6 illustrates exemplary steps of a axle torque based driver interpretation method according to the principles of the present disclosure.

Referring now to FIG. 6, an axle torque driver interpretation method is illustrated. A torque request is determined in each of the steps of the axle torque driver interpretation method. Each of the determined torque requests may include a predicted torque request and an immediate torque request.

A driver torque request is determined in step 602. The driver torque request may be determined based on a predetermined relationship between a driver input, a vehicle speed, and a desired axle torque. One or more mappings of the driver input to the desired axle torque may be used to determine the driver torque request. The vehicle speed may be used to select one of the mappings. The driver torque request may be equal to the desired axle torque determined based on the selected mapping and the driver input.

A shaped torque request is determined in step 604. The shaped torque request may be determined based on the driver torque request and a desired torque adjustment rate. The driver torque request may be shaped such that a resulting actual axle torque changes at the desired torque adjustment rate within a clunk zone defined by upper and lower clunk zone torques. The desired torque adjustment rate may be predetermined to prevent a clunk noise that may occur as the actual axle torque transitions through a zero torque.

An axle torque request is determined in step 606. The axle torque request may be determined based on results of arbitration between the shaped torque request and other axle torque requests. The other axle torque requests may include a torque reduction requested by a traction control system when positive wheel slip is detected. The other axle torque requests may also include brake management requests and vehicle overspeed torque requests.

An axle power request is determined in step 608. The axle power request may be determined based on an amount of power required to satisfy the shaped predicted and immediate torque requests at the vehicle speed. A propulsion power request is determined in step 610. The propulsion power request may be determined by compensating for mechanical losses in a transmission to satisfy the axle power requests. A predetermined minimum amount of mechanical losses for the transmission may be used to determine the propulsion power request.

A secured torque request is determined in step 612. The secured torque request may be determined by converting the propulsion power request from the propulsion power domain into the propulsion torque domain using an actual engine speed. An unclamped torque request is determined in step 614. The unclamped torque request may be determined by converting the axle torque request from the axle torque domain to the propulsion torque domain using a gear of the transmission.

The gear used to determine the unclamped torque request may be a commanded gear and/or an actual gear. For example, an unclamped predicted torque request may be determined based on a predicted axle torque request and the commanded gear. In another example, an unclamped immediate torque request may be determined based on an immediate axle torque request and the actual gear.

A clamped torque request is determined in step 616. The clamped torque request may be determined based on an absolute minimum of the unclamped torque request and a sum of the secured torque request and a security threshold torque. The security threshold torque may be determined such that the sums of the security threshold torque and each of the secured torque requests result in an absolute acceleration rate that is less than or equal to a maximum desired acceleration within a predetermined period.

A propulsion torque request is determined in step 618. The propulsion torque request may be determined based on results of arbitration between the clamped torque request and other propulsion torque requests. The other propulsion torque requests may result from engine over-speed protection, stall prevention, gear shifts, clutch fuel cutoff, and an engine shut-off request.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

an axle torque arbitration module that determines an axle torque request based on a driver input and a vehicle speed;

a power security module that determines a secured torque request based on the axle torque request, the vehicle speed, and an engine speed;

a propulsion torque arbitration module that determines a propulsion torque request based on the axle torque request and the secured torque request; and an actuation module that controls at least one of air, spark, and fuel provided to a cylinder of an engine based on the propulsion torque request.

2. The control system of claim 1, further comprising a driver torque module that determines a driver torque request based on the driver input and the vehicle speed, wherein the axle torque arbitration module determines the axle torque request based on the driver torque request.

3. The control system of claim 2, further comprising a clunk zone shaping module that determines a shaped torque request based on the driver torque request and a desired torque adjustment rate associated with an axle torque transition through a zero torque.

4. The control system of claim 3, further comprising an axle torque determination module that determines the axle torque request based on the shaped torque request and at least one axle torque request that is based on parameters other than the driver input.

5. The control system of claim 4, further comprising an axle power determination module that determines an axle power request based on the vehicle speed and the shaped torque.

6. The control system of claim 5, further comprising a propulsion power conversion module that determines a propulsion power request based on the axle power request and a predetermined transmission loss.

7. The control system of claim 6, further comprising a propulsion torque security module that determines the secured torque request based on the propulsion power request and the engine speed.

8. The control system of claim 7, further comprising a propulsion torque conversion module that determines an initial torque request based on the axle torque request and a transmission ratio.

9. The control system of claim 8, further comprising a torque security clamping module that determines a final torque request based on the initial torque request, the secured torque request, and a security threshold torque.

10. The control system of claim 9, further comprising a propulsion torque determination module that determines the propulsion torque request based on the final torque request and at least one propulsion torque request that is based on parameters other than the driver input.

11. A method, comprising:

determining an axle torque request based on a driver input and a vehicle speed;

determining a secured torque request based on the axle torque request, the vehicle speed, and an engine speed;

determining a propulsion torque request based on the axle torque request and the secured torque request; and controlling at least one of air, spark, and fuel provided to a cylinder of an engine based on the propulsion torque request.

12. The method of claim 11, further comprising determining a driver torque request based on the driver input and the vehicle speed and determining the axle torque request based on the driver torque request.

13. The method of claim 12, further comprising determining a shaped torque request based on the driver torque request and a desired torque adjustment rate associated with an axle torque transition through a zero torque.

14. The method of claim 13, further comprising determining the axle torque request based on the shaped torque request and at least one axle torque request that is based on parameters other than the driver input.

15. The method of claim 14, further comprising determining an axle power request based on the vehicle speed and the shaped torque.

16. The method of claim 15, further comprising determining a propulsion power request based on the axle power request and a predetermined transmission loss.

17. The method of claim 16, further comprising determining the secured torque request based on the propulsion power request and the engine speed.

18. The method of claim 17, further comprising determining an initial torque request based on the axle torque request and a transmission ratio.

19. The method of claim 18, further comprising determining a final torque request based on the initial torque request, the secured torque request, and a security threshold torque.

20. The method of claim 19, further comprising determining the propulsion torque request based on the final torque request and at least one propulsion torque request that is based on parameters other than the driver input.

* * * * *